July 11, 1972  F. R. RAGLAND, JR  3,676,129
METHOD FOR MAKING A LIGHT INTENSITY CORRECTION FILTER
Filed Dec. 1, 1969

INVENTOR.
Frank R. Ragland Jr.
BY
ATTORNEY 3,676,129
METHOD FOR MAKING A LIGHT INTENSITY CORRECTION FILTER
Frank Rowland Ragland, Jr., Lancaster, Pa., assignor to RCA Corporation
Filed Dec. 1, 1969, Ser. No. 881,233
Int. Cl. G03c 5/00, 11/00
U.S. Cl. 96—38.3          5 Claims

ABSTRACT OF THE DISCLOSURE

To make a light intensity correction filter for a lighthouse:

(1) prepare a transmission pattern which, when placed in a predetermined position adjacent an element of the lens assembly of the lighthouse, compensates for nonuniformities in brightness due to asymmetrical refraction of light projected through the lens assembly;
(2) prepare a negative image of the transmission pattern;
(3) position is a lighthouse a light source, at least one optical element of the lens assembly, which element carries on one surface thereof a layer of a photosensitive composition containing light attenuation material, and the negative image;
(4) project light from the light source incident upon the coating of photosensitive composition;
(5) and then develop the exposed coating to produce the filter.

BACKGROUND OF THE INVENTION

This invention relates to a method for making an improved light intensity correction filter for a lighthouse. A lighthouse of this type may be used, for example, for manufacturing a screen structure for a cathode-ray tube, such as a color television picture tube.

Lighthouses and their use for preparing screen structures for cathode-ray tubes are described in the prior art, such as in U.S. Pat. No. 2,817,276 to D. W. Epstein et al., and elsewhere. Such lighthouses may include a lens assembly comprised of one or more optical elements and means for projecting a light field from a substantially point light source through the lens assembly and then incident upon a layer of light-sensitive material.

The prior art notes that the light intensity across the light field at the light-sensitive layer is not uniform due to causes which may be inherent in the geometry of the optical system or may be due to imperfections in parts of the optical system. It has been proposed to correct symmetrical nonuniformities in the light field by interposing in the lens assembly symmetrical bands or coatings of light-attenuating material. It has also been proposed to interpose an intensity correction filter in the lens assembly which corrects for asymmetrical nonuniformities in the light field. One such filter is described in patent application Ser. No. 844,852, filed July 25, 1969 by Harry R. Frey now Pat. No. 3,592,112. Such a filter may be prepared by positioning a photosensitive layer containing light-attenuation material in the lens assembly, exposing the layer to the light field until the layer, upon development, produces a light-attenuating filter which is a negative of the intensity variations in the light field. After development, this light intensity correction filter is returned to its position in the lighthouse where it is used in combination with the particular light source and lens assembly with which it was made. It has been found that such a filter may compensate for brightness nonuniformities in the light field which originate outside the lens assembly. Nonuniformities in the light field which originate in the lens assembly itself due to refraction are too close to the photosensitive layer to be compensated for with this filter.

SUMMARY OF THE INVENTION

The novel method for making a light intensity correction filter for a lighthouse comprises:

(1) preparing a transmission pattern which, when placed in a predetermined position adjacent an element of the lens assembly of the lighthouse, compensates for nonuniformities in brightness due to asymmetrical refraction of light projected through the lens assembly;
(2) preparing a negative image of the transmission pattern;
(3) positioning in a lighthouse a light source, at least one optical element of said lens assembly, which element carries on one surface thereof a layer of a photosensitive composition containing light-attenuation material, and the negative image; the light source, the optical element and the negative image all being in predetermined positions with respect to one another;
(4) projecting light from the light source incident upon the layer of photosensitive composition;
(5) and then developing the exposed layer to produce the said filter.

The novel method produces an intensity correction filter which compensates for nonuniformities which originate in the lens assembly. In combination with prior methods, the novel method is capable of producing an intensity correction filter for a lighthouse which compensates for substantially all nonuniformities in the light field, including asymmetrical nonuniformities which originate in the lens assembly and in the light source, and symmetrical nonuniformities inherent in the geometry of the system.

DESCRIPTION OF THE PREFERRED EMBODIMENTS

Figure 1:
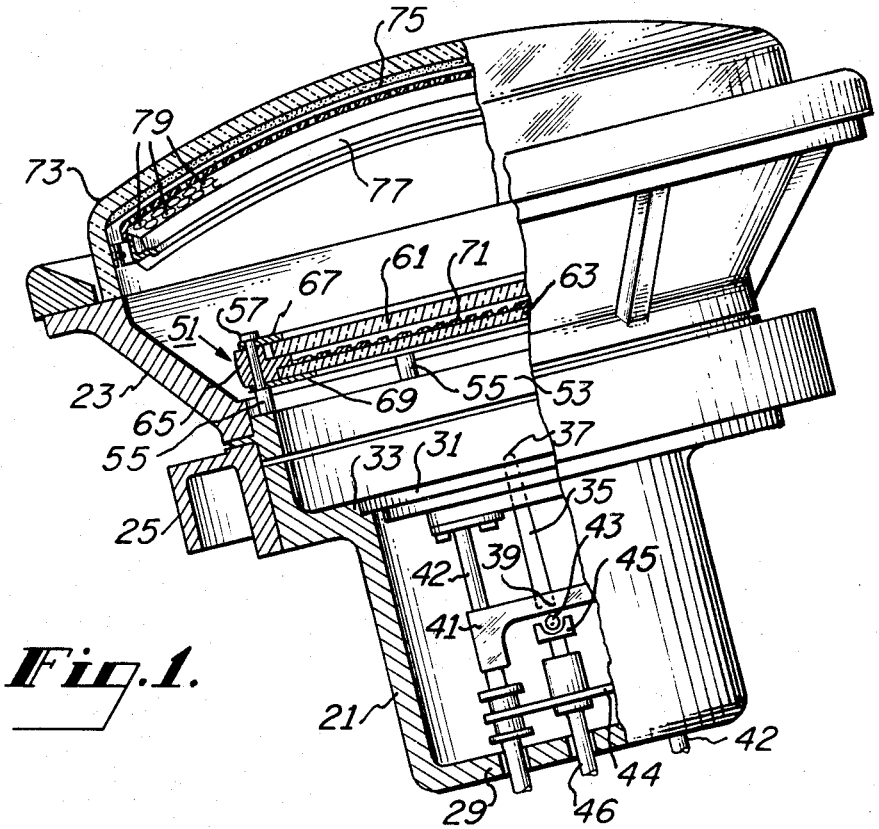
FIG. 1 is a partially broken away elevational view of a lighthouse comprised of a lens assembly including a filter prepared by the novel method.

Example.—The novel method may be used to prepare a light intensity correction filter for the lighthouse illustrated in FIG. 1. The lighthouse is comprise of a light box 21 and a panel support 23 held in position by bolts (not shown) with respect to one another on a base 25. The light box is a cylindrical cup-shaped casting closed at one end by an integral end wall 29. The other end of the light box 21 is closed by a plate 31 which fits in a circular recess 33 in the light box 21. The plate 31 has a central hole therein through which a light pipe 35 (referred to as a collimator in the tube making art) in the form of a tapered glass rod extends. The narrow end 37 of the light pipe 35 extends slightly beyond the plate 31 and constitutes a point source of light for the lighthouse. The wider end 39 of the light pipe 35 is held in position by a bracket 41 opposite a lamp 43 within the light box 21. A light reflector 45 is positioned behind the lamp 43. The bracket 41 is mounted on two pipe sections 42 which carry cooling water to and from the plate 31. The lamp 43 and the reflector 45 are both mounted on a bracket 44 which in turn is mounted on the pipes 42. Attached to the bracket 44 is a pipe section 46 carrying cooling air to the lamp 43 and the reflector 45. The pipes 42 and 46 each extend through oversized holes in the end wall 29.

A lens assembly 51 is mounted on a lens assembly support ring 53 and stand off spacers 55 with bolts 57. The support ring 53 is clamped in position between the base 25 and the panel support 23. The lens assembly 51 is comprised of a correction lens 61 and a wedge lens 63 held and spaced from each other by a separator ring 65, an upper clamp 67 and a lower clamp 69. The upper surface of the wedge lens 63 has thereon a light intensity correction filter 71. The filter 71 is preferably in the form of a relief image comprised of preformed carbon particles (mean diameter about 10 millimicrons) in gelatin or other clear colorless binder. The filter 71 varies in thickness up to about 3,000 angstroms thick. This is about a half wavelength for yellow light.

In one mode for operating the lighthouse of FIG. 1 for preparing a light-absorbing matrix, a faceplate panel 73 having a layer 75 comprised of light-sensitive material, such as dichromate-sensitized polyvinyl alcohol, on the inner surface thereof and a mask assembly 77 mounted therein, is placed in position on the panel support 23 as shown in FIG. 1. A light field from the narrow end 37 of the light pipe 35 passes upwardly through the wedge lens 63, the filter 71 and the correction lens 61. In passing through the filter 71, the point-to-point intensity variations in the light field are reduced by the selective transmittance in the filter. The light field then passes upwardly through the apertures 79 in the mask assembly 77. The light passing through the apertures falls incident upon the photosensitive layer 75 exposing the light-sensitive binder, thereby changing its solubility characteristics. Since the light intensity is more uniform across the light field, the binder is more uniformly exposed. After exposure, usually of the order of 5 to 25 minutes, the light is eclipsed, the panel 73 is removed from the support, the mask assembly 77 is removed from the panel 73, and the photosensitive layer 75 is developed to produce the desired image on the panel 73 which, in this case, is comprised of dots of insolubilized polyvinyl alcohol on bare glass. The image is overcoated with light-absorbing material, such as fine-particle carbon. Then, the dots are removed by treatment with a hydrogen peroxide solution carrying with them the overlying carbon. The carbon between the dots remains adhered to the glass and constitutes the light-absorbing matrix. Phosphor dots may then be deposited over the holes in the matrix.

Figure 2:
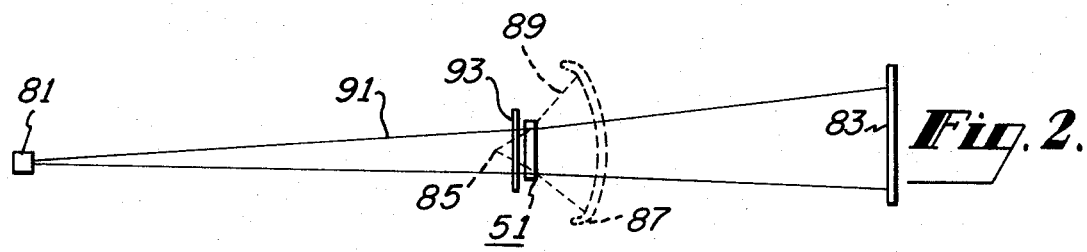
FIG. 2 is an elevational view of an optical bench for practicing part of the novel method.
Figure 3:
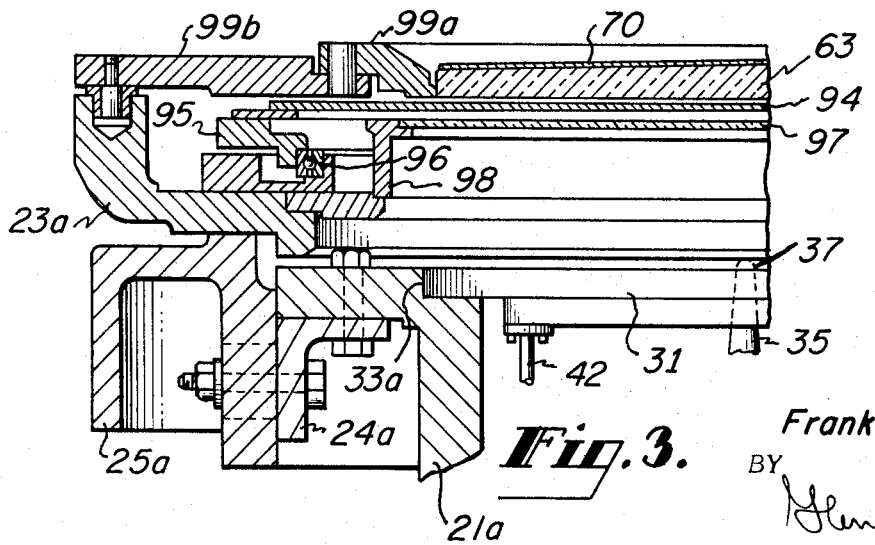
FIG. 3 is a sectional elevational view of a portion of a lighthouse used for practicing another portion of the novel method.

The filter 71 shown in FIG. 1 may be prepared by the following procedure with reference to FIGS. 2 and 3. As shown in FIG. 2, a lens assembly 51 from the lighthouse shown in FIG. 1 is mounted vertically on a table (not shown) about midway between a mercury arc point, light source 81 and a white screen 83, which are about 8 feet apart. The spacing are not critical, although they are substantially greater than the spacing used in the lighthouse shown in FIG. 1. The point 85, the dotted faceplate panel 87, and the doted cone of light 89 for a typical lighthouse arrangement illustrate that this step employs a substantially narrower cone of light 91 than the cone of light 89 employed in the lighthouse. The combination of point light source 81 and narrower cone of light provides a substantially uniform light field at the screen 83 in the absence of the lens assembly 51. The spacings provide in addition convenient dimensions for preparing the transmission pattern.

A first plate 93 of optical glass, which may be about 11¾ inches in diameter and ¼ inch thick, is placed adjacent and on the light source side of the lens assembly 51. Although considered less convenient, the first plate 93 may be placed on the screen side of the lens assembly 51. The alignment marks on the first plate 93 are aligned with the alignment marks on the lens assembly 51 and held in that alignment. Light from the light source 81 is projected through the first plate 93 and the assembly 51 onto the screen 83 where the light field may be observed. A suspension of opaque particles in a vehicle is sprayed with an air brush upon selected areas of the first plate 93 until the light field on the screen 83 appears substantially uniform thereby producing a transmission pattern. One preferred suspension is prepared by mixing 40 grams of a 25% carbon (acetylene black) in xylene suspension with 959 grams of toluene. About 1.0 gram of a surfactant is included to aid in stabilizing the suspension. The uniformity of the light field on the screen 83 may be monitored by eye or by light meter or both.

Next, the first plate 93 with the transmission pattern thereon is removed from the apparatus illustrated in FIG. 2 and a negative image of the pattern is prepared. To this end, a 10-inch diameter by ¼-inch thick second plate of optical glass is coated with a photosensitive composition containing light attenuation material; such as the light-sensitive carbon-gelatin composition described below. The pattern on the first plate 93 is placed against the glass surface opposite the coating on the second plate and the alignment marks thereon are lined up. The coating is exposed through the transmission pattern to light from a fluorescent light box containing 12 15-watt ultraviolet (black light) lamps spaced about 1½ inches apart and about 14 inches away.

The first and second plates are separated, and the coating on the second plate is developed as described below with respect to the exposed coating 70 to produce the negative image of the transmission pattern. The developed negative image is dried and then coated, as by spin coating, with a 5% aqueous gelatin solution and then dried to produce a gelatin coating which reduces the light interference patterns produced by the thin negative image.

Next, the upper surface of the wedge lens 63 is cleaned, rinsed in an 0.05 weight percent aqueous gelatin solution and then dried. The surface is then rinsed in warm (50° C.) deionized water and again dried, leaving a thin gelatin precoating on the surface. The precoated surface is coated with a layer of a photosensitive carbon-gelatin composition comprised of very fine particle carbon in a sensitized gelatin binder. The preferred carbon is a channel black called Black Pearls 607 marketed by Cabot Corporation, Boston, Mass. This material has a mean particle diameter of about 9 millimicrons by electron micrograph (E.M.) study.

One suitable coating composition contains about 120 grams Black Pearls 607, about 12 grams Marasperse CB dispersing agent, about 42 grams Brij 35 SP wetting agent, about 1380 grams gelatin, about 10,000 grams deionized water, about 37 grams Hardener #3 (4,4'-diazidostilbene-2,2'-disulfonic acid sodium salt) which is a sensitizer for the gelatin, and about 300 grams ammonium hydroxide solution. A warm (40° C.) quantity (about 150 cc.) of this liquid composition is poured upon the slowly rotating lens. The lens is then spun at about 60 r.p.m. until the composition has spread to a uniform layer about 1 mil thick and then gelled (about 3 minutes). After cooling and drying, the coated wedge lens 63 may be placed in the lens assembly 51 and the lens assembly placed in the position in which it is to be used in the lighthouse shown in FIG. 1. The second plate with the negative image thereon is placed adjacent the wedge lens 63 and aligned with it. A light field is projected from the light pipe 35 incident upon the coating for about 2 to 5 minutes at about 45 footcandles. The optimum exposure is determined empirically.

Preferably, however the second plate 97 with the negative image thereon, the wedge lens having the photosensitive coating 70 thereon and the point light source with which it is to be used are placed in the dodger lighthouse shown in FIG 3. The dodger lighthouse is comprised of a light box 21a and a wedge lens support 23a held in position with respect to one another by angle pieces 24a and bolts (not shown) on a base 25a. The light box is similar in design to that shown in FIG. 1 and includes a circular recess 33a adapted to receive the plate 31 and the attached parts of the light source including the lamp 43, the reflector 45 and the light pipe 35.

The dodger lighthouse includes also a dodger plate 94 which may be a brass plate with a pattern cut in the center thereof. The dodger plate 94 is mounted on a dodger frame 95 which rests on ball bearings 96 and has means (not shown) for rotation. In practice, the second plate 97 is mounted with the negative image up in a second plate support 98 under the dodger plate 94. Then, the dodger plate 94 is placed in position. Finally, the wedge lens 63 with the coating side up is placed in a first support ring 99a which in turn is placed in a second support ring 99b and the three parts positioned on the wedge lens support 23a.

A light field is projected from the light pipe 35 incident upon the carbon-gelatin coating 70 for about 2 to 5 minutes at about 45 footcandles. The optimum exposure is determined empirically. During the exposure, the dodger plate 94 is rotated and permits a symmetrically compensated light field to be transmitted. The rotating dodger plate 94 compensates for symmetrical variations in brightness in the light field due to the spreading of the light in the optical system.

Following the above procedure, the exposed coated wedge lens 63 is removed from the respective lighthouse and the exposed coating 70 developed to produce a light intensity correction filter 71. By one procedure the lens 63 is placed first in a dilute (about 0.01 to 1.0 weight percent) solution of potassium alum for about 5 minutes at room temperature, and then is immersed with the exposed coating faced down in flowing warm (50° C.) water. The water is permitted to flow slowly for about 30 minutes, being careful not to disturb the system. During this developing step, the unexposed coating slowly dissolves leaving the exposed material in position on the lens. The temperature of the incoming flowing water is then lowered to 15° C. When the temperature of the water bath is below 20° C., the lens is removed from the flowing water, dried, and is ready for use. In use, the lens is positioned in the same position with respect to the light pipe 35 in which the coating 70 was exposed during the preparation of the filter 71.

General considerations.—In preparing the transmission pattern, as in FIG. 2, a lighthouse lens assembly except for the filter 71 is used during the projection. The first plate 93 is placed adjacent (either side) of the lens assembly in a known position with respect to the lens assembly. This is conveniently done by matching alignment marks which are present on each of the respective parts. The type of light source and the type of screen are not critical. The lens assembly for a lighthouse is comprised of optical elements which alone are not truly lenses and in combination is not truly a lens because there is no common focal point for the element or assembly. The lens assembly is technically a divergent beam bender. It is designed to cause the light passing through the holes 79 in the mask 77 to follow a path that will subsequently approximate the paths of electron beams in the cathode-ray tube into which the mask and faceplate are incorporated. In order to closely approximate the electron paths, the lens assembly necessarily has a complex, non-symmetrical curvature which processes light beams that are mostly divergent but some of which are convergent.

The distance from the light source to the lens assembly and lens assembly to screen in FIG. 2 is not critical although there are positions for producing optimum contrast in the light field on the screen. The distance from the light source to the lens assembly is mainly effective in determining the image size on the screen. The distance from the lens assembly to the screen determines the image contrast for a particular lens assembly design and is best determined empirically. As a light ray passes through a particular area of the lens assembly, it is refracted an amount dependent upon the curvature of the lens elements in that area. If the curvature is such as to produce convergence for a particular beam, a focal point can be found at some distance from the lens assembly and will appear as a bright area on the screen. As the screen is moved nearer to the lens, the light constituting the bright area will be defocused or spread over a greater area and will contrast less with the surrounding area. Such is the case in a lighthouse where the panel is a few inches from the lens assembly and the light pattern caused by the lens assembly is barely perceptible to the human eye.

The transmission pattern may be produced by any convenient method of application of material and with any type of opaquing material by painting, splattering, spraying or other suitable application technique. Any particulate material that does not transmit light is suitable. Carbon is the preferred material, particularly channel black and acetylene black. Other materials such as manganese dioxide and silver may be used. The particle size is not critical but is preferably small, in the range normally used in pigment grade materials. The important thing is that the transmission pattern causes the light field on the screen to have a substantially uniform brightness. Generally, the transmission pattern compensates for broad area variations in brightness and has little effect on fine structure variations in brightness.

After the transmission has been dried, a negative image of this pattern is prepared by any convenient technique. A silver halide emulsion or a photobinder-pigment composition may be used. The substrates used for the transmission pattern and for its negative image may be any transparent plates which do not introduce substantial variations in the brightness of the light field. Clear flat glass plates are preferred. It is important that the alignment marks on the pattern be carried forward into the negative image. It is also important that the negative image is not reversed; for example, that the right side of one does not correspond to the left side of the other.

After the negative image is completed, the intensity correction filter is prepared. One negative image may be used with any lens assembly of the same family or having the same optical characteristics to make the filter. The process may be continued as described in the cited Frey application except that the negative image is positioned, using alignment marks, in the path of the light in the lighthouse. All of the remarks made toward this end in the cited Frey application are also applicable in the novel method. Also, in addition to the carbon-photobinder mixture used to make the filter as disclosed in the Frey application, silver halide, light-opacifiable glass, or other photosensitive compositions may be used.

The dodger lighthouse (FIG. 3 herein) is a convenient apparatus for making many light intensity control filters. It provides a light box for plates of standardized size with the attached light source from factory lighthouses, and also provides a support for lens elements or lens assemblies of the same lighthouses repectively in the same relative positions with respect to one another as in the factory lighthouses. It differs from a factory lighthouse at least by eliminating the faceplate support and by including a support for the negative image and by including a dodger. Thus, the dodger lighthouse is capable of producing improved intensity controlled filters which compensate for variations in brightness which originate from singularities in the light source and refraction in the lens assembly, and also for symmetrical variations in brightness due to the geometry of the optical system.

The filter may reside on the top surface of the compensating lens 61 or may reside on the top surface of a separate optical element wherein it is positioned between the compensating lens 61 and the wedge 63, instead of on the wedge lens 63. In any of the foregoing alternatives, the assembly 51 may be mounted as shown in FIG. 1. Also, the functions of the correction lens 61 and the wedge lens 63 may be combined into a single lens element.

The filter may include other compensations besides those for point-to-point intensity variations. For example, the filter may include compensations for the geometry of the system, such as a center-to-edge variation in light intensity due to the spreading of the light. Also, the filter may be designed to impart predetermined variations in light intensity in the light field. Thus, the filter may be used to produce a more uniform light field or a field with predetermined light intensity variations. The compensations may be achieved solely with the above described filter or in combination with other types of filters, such as metal opaquing on one or more of the optical elements.

Because of its thickness, an observer may see interference patterns in the filter, which patterns have been found not to interfere with the novel method. These interference patterns may be eliminated by applying over the filter 71 an overcoating of clear colorless gelatin or a similar substance.

The filter has essentially a neutral gray transmittance varying only in the intensity of grayness. The intensity of grayness varies from point-to-point so that point-to-point variations in brightness in the light field are reduced. That is, the filter has variations in transmittance which are in registration with and inverse to the variations in intensity in the light field passing through the filter. These variations in transmittance reduce the light intensity variation in the light field.

There may be many sources causing variations in light intensity in the optical system. These may come from particular parts of the optical system such as from: the lamp 43, its position with respect to the light pipe 35, the light pipe 35 particularly the narrow emitting end 37, the wedge lens 63, the correction lens 61, the reflector 45, or its position with respect to the light pipe 35. Any singularities, such as imperfections in these optical elements, internal or surface, may have the effect of producing dimmer or brighter areas in the light field. The filter may be used in the fabrication of any screen structure by the direct photographic process. For example, the filter may be used in making a light-absorbing matrix and/or the phosphor dots for a dot screen for a picture tube; or guard bands and/or phosphor stripes in a line screen for a picture tube.

I claim:

1. A method for making a light intensity correction filter for a lighthouse having an optical system including a lens assembly and means for projecting a light field from a substantially point light source through said lens assembly, said method comprising
   (1) preparing a transmisison pattern by a sequence of steps including:
      (a) projecting light from a light source through said lens assembly to produce a refracted light field,
      (b) intercepting said refracted light field upon a screen which is displaced a substantial distance from said lens assembly,
      (c) positioning a first transparent plate in a known location and orientation adjacent said lens assembly between said light source and said screen,
      (d) and variably coating a surface of said first plate with particles of a light-attenuating material so as to produce at the screen a light field which is substantially uniform in light intensity across said light field, said coating comprising said transmission pattern;
   (2) preparing a negative image of said pattern;
   (3) positioning in a lighthouse (i) a light source, (ii) said lens assembly, at least one optical element of which carries on one surface thereof a layer of a photosensitive composition containing light-attenuation material, and (iii) said negative image; said negative image being positioned in said known location and orientation adjacent said lens assembly and between said lens assembly and said light source;
   (4) projecting light from said light source incident upon said layer of photosensitive composition;
   (5) and then developing said layer to produce said filter.

2. The method defined in claim 1 wherein said light-attenuating material in step 1(d) includes particles of carbon.

3. The method defined in claim 1 wherein said light-attenuating material in step 1(d) is sprayed upon said first transparent plate.

4. The method defined in claim 1 wherein said negative image is comprised of light-absorbing particles in a binder.

5. The method defined in claim 4 wherein said negative image is comprised of finely-divided carbon particles in an organic binder.

References Cited
UNITED STATES PATENTS

| | | | |
|---|---|---|---|
| 2,817,276 | 12/1957 | Epstein et al. | 95—1 |
| 3,149,968 | 9/1964 | Stephens | 96—27 |
| 3,582,326 | 6/1971 | Smithgall | 96—36.1 |

NORMAN G. TORCHIN, Primary Examiner

E. C. KIMLIN, Assistant Examiner

U.S. Cl. X.R.

96—27, 38.2